March 6, 1956  J. W. ROBY, JR., ET AL  2,737,615
CONTROL CIRCUIT FOR SENSING ELECTRICAL RESISTANCE
Filed May 18, 1953  3 Sheets-Sheet 2
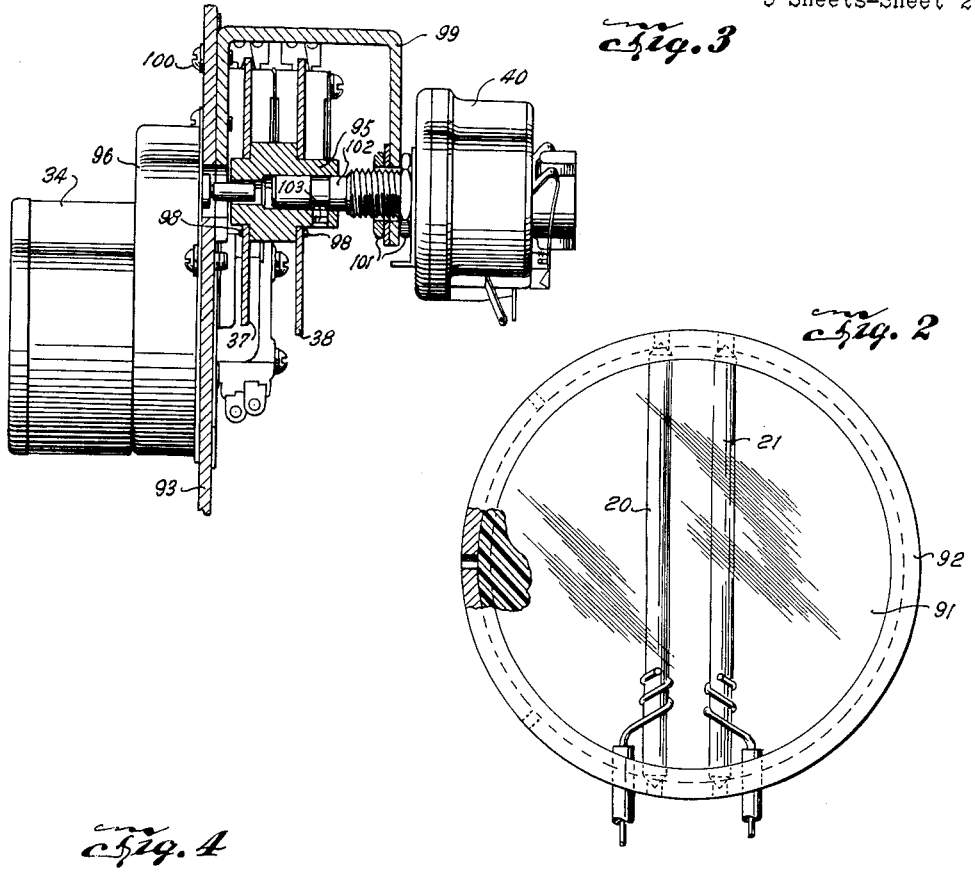
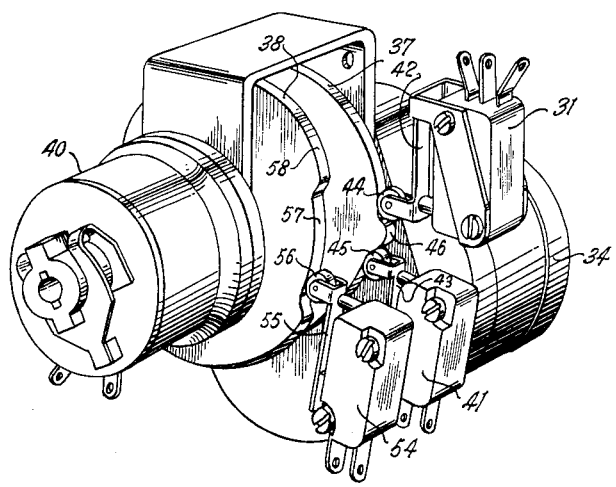
JOHN W. ROBY, JR.
MAX E. SNODDY
INVENTOR.
BY
ATTORNEY March 6, 1956  J. W. ROBY, JR., ET AL  2,737,615
CONTROL CIRCUIT FOR SENSING ELECTRICAL RESISTANCE
Filed May 18, 1953  3 Sheets-Sheet 3

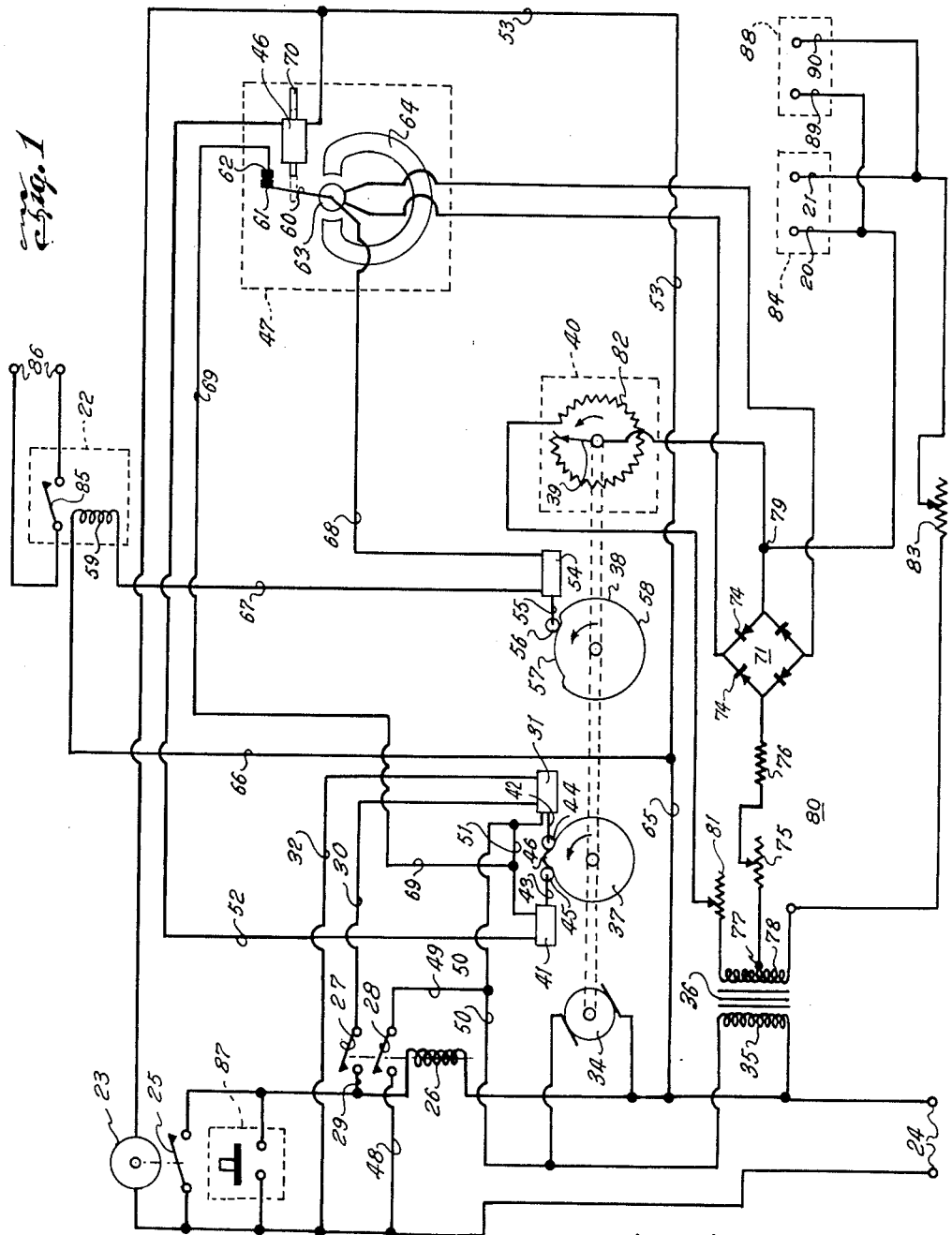

JOHN W. ROBY, JR.
MAX E. SNODDY
INVENTOR.

ATTORNEY

United States Patent Office 2,737,615
Patented Mar. 6, 1956

2,737,615

CONTROL CIRCUIT FOR SENSING ELECTRICAL RESISTANCE

John W. Roby, Jr., and Max E. Snoddy, Dallas, Tex.; said Roby assignor to said Snoddy Application May 18, 1953, Serial No. 355,474

14 Claims. (Cl. 317—141)

This invention relates to control circuits.

It is desirable to provide a control circuit which will periodically list or measure an electrical quantity and if the value of the latter falls within a certain predetermined range will actuate a load device. The load device may be a relay which controls an electrically operated system such as the automatic lawn sprinkling system of my co-pending application, Serial No. 339,549. Such automatic sprinkling systems operate at a preset time or times of the day regardless of soil and atmosphere conditions so that sprinkling of lawns takes place even if the moisture content of the soil is high and even though rain may be falling. It is, therefore, also desirable to provide a control circuit which will test or measure the moisture content of the soil and the humidity of the atmosphere to place a sprinkling system in operation if the moisture content of the soil and the humidity of the atmosphere are below preset values. Moreover, it is desirable that the control circuit be adjustable to operate properly under varying conditions of soil and lawn and with different soils having different electrical and moisture retention characteristics.

Accordingly, it is an object of the invention to provide a new and improved control circuit.

Another object is to provide a new and improved control circuit for testing or measuring an electrical quantity and to actuate a load device if the value of the electrical quantity falls within a certain range of values.

Another object is to provide a new and improved control circuit for testing or measuring an electrical quantity at predetermined intervals and to actuate a load device if the value of the electrical quantity falls within a certain range of values.

Still another object of the invention is to provide a control circuit, of the type described above, wherein the range of values may be adjusted to accommodate the control circuit for use under varying conditions.

A further object of the invention is to provide a new and improved control circuit for lawn sprinkling systems.

A still further object of the invention is to provide a control circuit of the type described having means for measuring the moisture content of the soil and operating an electrical device if the moisture content of the soil falls below a predetermined value.

Another object of the invention is to provide a new and improved control circuit of the type described having a means for measuring the humidity of air to prevent operation of the electrical device if the humidity of the air exceeds a predetermined value even if the moisture content of the soil is below the predetermined value.

Still another object of the invention is to provide a control circuit, of the type described, which operates at preset times.

Briefly stated, the new and improved control circuit includes a resistance bridge, one of whose arms includes a testing or measuring element whose resistance varies as the moisture content of the soil or the humidity of the air or both, and whose other arm includes a rheostat whose resistance may be varied over a predetermined range. The output of the resistance bridge is varied during each cycle of operation of the control circuit by a full scale adjustment of the rheostat so that at some point of adjustment of the rheostat the current output of the resistance bridge is zero. The output of the resistance bridge is connected to a meter type relay which closes to connect the electrical device when the current output of the bridge falls to zero if the point of zero output coincides with a predetermined range of value of the resistance of the testing or measuring means. Switch means operable simultaneously with the rheostat are provided to prevent this connection of the meter type relay to the electrical device during such times as the resistance of the testing and measuring means falls below the predetermined range of value of the resistance of the testing or measuring means. Clock operated switches and relays are provided to operate the rheostat and the switch means at predetermined intervals.

For a better understanding of the invention, reference may be had to the following description taken in connection with the accompanying drawing and its scope will be pointed out in the appended claims.

In the drawings,

Figure 1 is a schematic diagram of the control circuit;

Figure 2 is a plan view of one of the moisture measuring or testing elements;

Figure 4 is a perspective view of the cam operated switch means and the rheostat; and Figure 5 is a front plan view of the case housing the control circuit.

Figure 3:
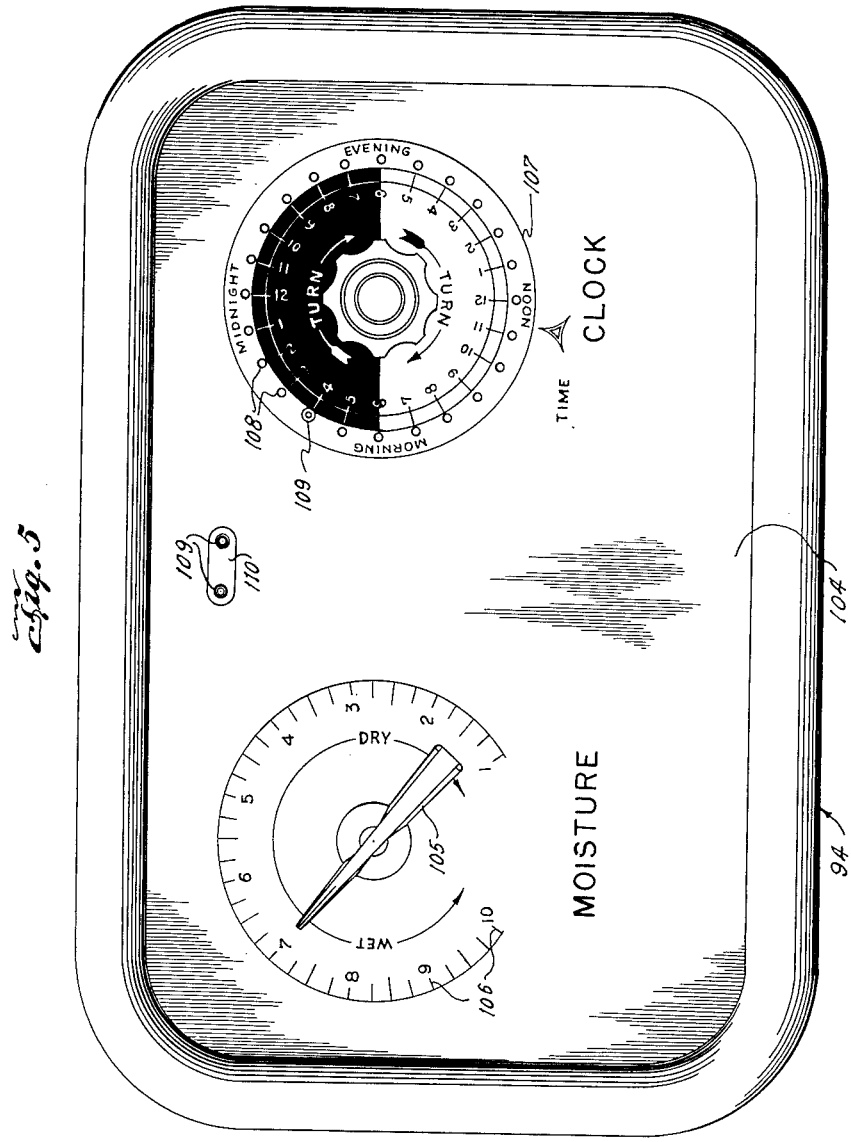
Figure 3 is a sectional view showing the cam operated switch means and the rheostat.

Referring now to the drawing, the control system for periodically testing a variable electrical quantity, such as the resistance of the ground indicated by the resistance across the electrodes 20 and 21, and operating an electrical device, such as the relay 22, if the value of the variable electrical quantity does not exceed a predetermined value, includes a master clock or motor 23 which is connected at all times across an alternating current input circuit 24. The clock 23 may be of any suitable construction, for example, that shown in my co-pending application, Serial No. 269,079, filed January 30, 1952, which momentarily closes a switch 25 at a predetermined time of the day. The switch 25, when closed, connects the relay winding 26 across the input circuit 24 causing it to move the relay contacts 27 and 28 simultaneously into closed position.

The relay contact 27 is provided to keep the relay winding 26 connected across the input circuit when the switch 25 moves back to open position after having been momentarily closed. The relay contact 27 connects the relay winding 26 across the input circuit through the conductors 29 and 30, the switch 31 which normally connects the conductor 30 to the conductor 32, and the conductor 32.

The relay contact 28, when in closed position, connects a cam motor 34 and the primary winding 35 of a transformer 36 in parallel across the input circuit 24.

The cam motor 34 is connected to and rotates simultaneously a control cam 37, a control cam 38 and the rotatable contact 39 of a rheostat 40.

The micro-switches 31 and 41 have operating levers or members 42 and 43, respectively, whose outer ends are provided with rollers 44 and 45 which ride upon the periphery of the control cam 37. The cam 37 has an outwardly extending projection or spur 46 which moves outwardly the operating members 42 and 43 of the switches 41 and 31 to actuate these switches in this order as the cam is rotated. The switch 41, when actuated, connects a solenoid 46, of a meter type relay 47, across the input circuit, for a purpose to be described below, through the conductor 48, the relay contact 28 and the conductors 49, 50, 51, 52 and 53. Toward the end of each cycle of rotation of the control cam 37, the switch 31 is actuated by the spur 46 to disconnect the conductors 30 and 32 from each other to thus de-energize the holding relay 26 and simultaneously to connect the conductor 32 to the conductor 50 to keep the cam motor 34 connected across the input circuit until the control cam 37 is rotated back to the position shown in Figure 1 with the spur or rise 46 disposed between the rollers 44 and 45. When the spur 46 reaches this position, the micro-switch 31 returns to its original non-actuated position and connects the conductors 30 and 32 but since the contact 27 is moved to open position when the holding coil 26 was de-energized, the cam motor will remain disconnected from the supply circuit.

The normally open micro-switch 54 has an actuating member 55 whose outer end is provided with a roller 56 which rides on the periphery of the control cam 38. The control cam has a recess providing a surface 57 of lesser radius than the operating surface 58. The switch 54 is in open position when the roller 56 rides on the surface 57 and in closed position when the roller rides on the surface 58. The switch 54, when in closed position, connects one end of the relay winding 59 of the relay 22, whose other end is connected to the input circuit, to the pointer arm 60 of the meter type relay 47. The pointer 60 is provided at its outer end with a contact 61 which engages a stationary magnetized contact 62 when no current flows through the coil 63 of the meter type relay 47. The coil 63 is rotatably mounted between the poles of a permanent magnet 64, as in conventional relays of the meter type, and tend to rotate counter-clockwise against the resistances of the usual spiral spring, not shown, of the relay, when current flows through the coil 63.

The magnetized contact 62 attracts the contact 61 on the pointer arm 60, which is made of iron or other magnetic material, when the contact 61 approaches the magnetized contact to provide a snap action between the contacts and to insure positive engagement of the two contacts. The coil 63 is so connected that the pointer arm 60 approaches the contact 62 when the current in the coil 63 approaches a zero value and, therefore, when no current flows through the coil 63, the contacts 61 and 62 are in engagement. When the contacts 61 and 62 are in engagement, the relay winding 59 may be connected across the supply circuit through the conductors 65, 66, 67, the switch 54, conductor 68, the pointer arm 60 which is made of a conducting substance, the contacts 61 and 62, conductors 69, 51, 50 and 49, the relay contact 28 and conductor 48. It will thus be seen that the switch 54 must be in closed position if relay coil 59 is to be energized.

The solenoid 46 has a plunger 70 which engages the pointer arm 60 and moves it away from the contact 62 when the solenoid 46 is energized. The solenoid 46 is needed to open or disengage the contacts 61 and 62 since the magnetic force of the magnetized contacts 62, once the contacts abut each other, would hold these contacts in closed position even though current flowed through the coil 63.

The coil 63 is energized with direct current from a rectifier 71 being connected across the output points 72 and 73 of the rectifier. The rectifier 71 is of conventional design, employing selenium rectifiers 74, and is connected in series with a variable or calibrating resistance 75 and a fixed current limiting resistance 76 between the electrical midpoint 77 of the secondary winding 78 of the transformer 36 and the juncture 79 of the two branches of a resistance bridge 80. One arm of the resistance bridge 80 includes a variable or calibrating resistance 81 and the resistance 82 of the rheostat 40 which are connected in series while the other arm includes a calibrating resistance 83 and the resistance across the electrodes 20 and 21 of the moisture testing element 84. The sides of the two arms of the resistance bridge 80 remote from the juncture 79 are connected to opposite sides of the secondary winding 78. It will be apparent now that when the combined value of the resistances 81 and 82 is equal to the combined value of the resistance 83 and the resistance between the electrodes 20 and 21, no current will flow through the resistances 75 and 76, the rectifier 71 and the coil 63 which constitute the center leg of the resistance bridge, the juncture 79 and the electrical midpoint 77 of the secondary winding being, in effect, the output points of the resistance bridge.

The moisture testing element 84 is employed to test the moisture content of soil, the resistance between its electrodes 20 and 21 varying directly as the moisture content. It is desirable, of course, to initiate the operation of a sprinkling system, as by closure of the contact 85 of the relay 22 when the moisture content of the soil falls below a predetermined value. The contact 85 closes a load circuit 86 which forms a part of an automatic sprinkler control such as that disclosed in my copending application Serial No. 339,549 filed March 2, 1953.

The rotary contact 39 varies the resistance of the arm of the resistance bridge of which the resistance 82 forms a part through a certain range during each cycle of operation of the cam motor 34 so that at some point during each such cycle, the resistances of the two arms of the bridge are equal and no current flows through the coil 63 regardless of the value of the resistance between the electrodes 20 and 21. The control cam 38 rotates simultaneously with the rotary contact 39 and its orientation with respect to the rotary contact is such that the switch 54 is open when the effective resistance of the rheostat is below a certain predetermined value and closed when the effective resistance of the rheostat equals or exceeds such predetermined value. Since no current flows through the coil 63 only when the resistances of the two arms of the resistance bridge are equal, and since the switch 54 is open when the resistance of the arm of the bridge which includes the rheostat 40 is below the predetermined value, the relay winding 59 can be energized during a cycle of operation of the cam motor only if the resistance between the electrodes 20 and 21 exceeds a predetermined value.

The mode of operation of the above described circuit will now be described. The moisture testing or measuring element is buried in the soil whose moisture content is to be tested and the calibrating resistances 75 and 83 are adjusted to provide for full deflection of the pointer arm 60 in a counterclockwise direction to open position when the soil is dry and the resistance between the electrodes is relatively great and for deflection of the pointer arm in a clockwise direction to closed position, wherein the contacts 61 and 62 engage, when the soil is saturated with moisture. The various relays and switches are then in the positions shown in Figure 1 with the switch 31 in non-actuated position connecting the conductors 30 and 32, switches 41 and 54 in open position, the contacts 61 and 62 in engagement with each other, and the rotary contact 39 in one extreme position wherein the full value of the resistance 82 is connected in the arm of the resistance bridge of which it forms a part.

At a preset time of the day, the clock 23 momentarily closes the switch 25 to connect the relay winding 26 across the supply circuit 24. Current now flows through the relay winding 26 causing the relay contacts 27 and 28 to close. The contact 27 when in closed position connects the relay winding 26 across the supply circuit through the closed switch 31 so that the contacts 27 and 28 are maintained in closed positions when the switch 25 opens after its momentary closure. The contacts 61 and 62 are in engagement but the energization of the relay winding 59 when the contact 28 closes is prevented by the switch 54 which is in open position.

When the contact 28 moves into closed position, it connects the cam motor 34 and the primary winding 35 across the supply circuit so that the cam motor begins to rotate the control cams 37 and 38 and the rotatable contact 39. Simultaneously, since the primary winding 35 is connected across the alternating current supply circuit 24, the resistance bridge is energized and, assuming that the resistances of the two arms of the bride are unequal, a current of a certain value, which varies directly as the degree of balance between the resistances of the two arms of the bridge, flows through the coil 63.

As the cam 37 rotates, its spur or rise 46 causes the operating member 43 of the micro-switch to be moved to close the micro-switch 41 so that the solenoid 46 is energized and its plunger 70 moves to the left to contact the pointer arm 60 and move it counterclockwise and disengage the contacts 61 and 62 which until then were held in engagement by the magnetic force of the magnetized contact 62 even though current now flows through the coil 63. Once the contacts 61 and 62 are disengaged by the plunger, the position of the pointer arm will vary with the value of the current in the coil 63, moving clockwise as the value decreases.

After the pointer arm 60 is freed by the plunger 70, the rotation of the cam 38 causes the roller 56 of the actuating member 55 to ride up to the surface 58 of the cam 38 and this closes the micro-switch 54 so that the relay winding 59 will be connected across the supply circuit if the current in the coil 63 drops to zero and the contacts 61 and 62 close while the roller 56 is riding on the raised surface 58 of the control cam 38.

The rotary contact 39 of the rheostat 82 is rotated simultaneously with the control cams progressively to decrease the effective resistance of the rheostat. If the moisture content of the soil in which the moisture sensitive element 84 is buried is low, the resistance between the two electrodes 20 and 21 is high so that the resistances of the two arms of the resistance bridge will become equal when the roller 56 is still riding on the raised surface 58 of the control cam 38 and the micro-switch 54 is closed. The pointer arm 60 will then swing clockwise and the contacts 61 and 62 will engage thus connecting the relay winding 59 across the supply circuit. The relay winding 59 thus closes the contact 85 of the load circuit 86 when the moisture content of the soil is below a predetermined value. Closing of the contact 85 will place in operation a sprinkling system of the type disclosed in my co-pending application, Serial No. 339,549 filed March 2, 1953 which will water the ground. It will be apparent that the contact 85 will take the place of the clock operated switch 30 of the sprinkling system shown in this co-pending application and that the closure of the contact 85 will initiate the same sequence of operation of the sprinkling system initiated by the closure of the switch 30. The clock attachment 11 of that sprinkling system, of course, initiates the operation of the sprinkling system at a preset time regardless of the condition of the soil while the use of the present control system with this sprinkling system will cause the sprinkling system to operate at a preset time only if the moisture content of the soil is below a predetermined value.

The control cams and the rotary contact 39 continue to rotate after the pointer arm moves to closed position and the relay winding 59 remains energized until the cam 38 rotates to a position wherein the roller 56 rides off the raised surface 58 down to the surface 57 to open the micro-switch 54. The contact 85, of course, opens when the relay winding 59 is disconnected from the supply circuit 24. Further, rotation of the cam 37 then moves the spur 46 under the roller 44 to actuate the switch 31 which disconnects the relay winding 26 from the supply circuit so that the contacts 27 and 28 move to open positions. The switch 31 simultaneously connects the conductors 50 and 32 so that the cam motor 34 will continue to operate to rotate the cams until the spur 46 of the cam 37 is between the rollers 44 and 45 and all the other switches and contacts are also in the positions shown in Figure 1. The cycle of operation of the control circuit is thus completed.

If the moisture content of the soil is high, the resistance between the electrodes 20 and 21 is low so that the resistances of the two arms of the resistance bridge do not become equal until the rotatable contact 39 and the cam 38 are rotated through a large angle and the roller 56 has moved off the raised surface 58 of the cam to the surface 57 to open the switch 54. When the resistances of the two arms become equal and the current in the coil 63 falls to zero, therefore, the contacts 61 and 62 close but since the switch 54 is now open, the relay winding is not connected across the supply circuit and the contact 85 will not be closed during this cycle of operation of the control circuit. In this manner, the control circuit illustrated and described measures or tests the moisture content of the soil in which the moisture sensitive element 84 is buried at a preset time of the day by measuring a variable electrical quantity, the resistance between the electrodes 20 and 21, which varies in accordance with the moisture content. The control circuit operates an electrical device, the relay 22, only if the value of the electrical quantity lies in a certain range at the time of the measurement or testing and the electrical device may be used to initiate the operation of other devices such as the sprinkling system referred to above.

A push button switch 87 may be provided to bypass the switch 25 so that the cycle of operation of this control circuit may be started at any desired time by closing the switch 87.

As was pointed out above, it is sometimes desirable to to make the operation of the sprinkling system to depend not only upon the moisture content of the soil but also upon the humidity of the atmosphere since a certain period of time elapses between the commencement of rainfall and the penetration of the soil by the rain water so that the moisture content of the soil about the element 84 could be low even while rain was falling. Under these conditions, of course, it is desirable to prevent the operation of the sprinkling system even though the moisture content of the soil is low. To achieve this result, a second moisture sensing or atmosphere element 88 is disposed six to eight feet above the ground. The atmosphere element has electrodes 89 and 90 connected in parallel with electrodes 20 and 21, respectively, so that the resistances between the two sets of electrodes are in parallel. The resistance between the electrodes 89 and 90 follows a steep curve changing rapidly with variations in the humidity of the atmosphere being extremely high when the relative humidity of the air is low and being very low when the humidity approaches one hundred per cent. In effect, the atmosphere element, as used in this control circuit, is sensitive only to very high humidity of the atmosphere since when the relative humidity drops to a moderate value, the resistance between the electrodes 89 and 90 becomes so high relative to the resistance between the electrodes 20 and 21 that it does not affect the operation of the control circuit. The resistance between the electrodes 20 and 21, however, follows a rather flat curve changing slowly with variations in moisture content of the soil. It will thus be seen that when the humidity of the air is very high, near one hundred per cent, as occurs shortly before, during and after a rainfall, the resistance between the electrodes 89 and 90 will be very low even though the resistance between the electrodes 20 and 21 is very high either because rain has not yet fallen or because it has not yet penetrated the ground to the moisture element 84. The combined resistance of the two elements will now be very low, since they are connected in parallel, and the resistances of the two arms of the resistance bridge will become equal only when the roller 56 rides on the reduced surface 57 of the cam 38 and the switch 54 is open thus preventing operation of the relay 22 even though the moisture content of the soil at that moment is low. It will rise of course as the rain is absorbed by the soil. Operation of the sprinkling system will thus be prevented to avoid waste of water.

The moisture elements consist of a pair of electrodes embedded or cast in disk 91 of a substance whose resistance varies with its moisture content. The disk may be protected by a circular plastic frame 92. Only the soil element 84 is shown in Figure 2 since the atmosphere element 88 is of similar construction.

In Figures 3 and 4 is shown the manner in which the control cams 37 and 38 and the rheostat are operated by the cam motor 34. The cam motor 34 is mounted on an internal plate 93 of a case 94, Figure 5, in which the control circuit is contained. The cam motor is connected to a cam hub 95 through a speed reducing mechanism 96 whose shaft 97 is rigidly secured in the cam hub by a press fit or in any other suitable manner. The control cams are rigidly secured to the cam hub by screws 98. A bracket 99 is secured to the internal plate 93 by screws 100 and supports the rheostat 40 which is secured to it by lock nuts 101. The shaft 102 of the rheostat, which rotates the rotary contact 39 of the rheostat, is rigidly secured to the cam hub 95 by a set screw 103. It will be seen now that the control cams 37 and 38 and the rotary contact 39 will be rotated simultaneously by the cam motor 34. The speed reducing mechanism 96 reduces the speed of rotation of the cam hub 95 to one revolution per minute so that the moisture sensing elements are subjected to an electrical current for only a very short period of time during any one cycle of operation of the control circuit.

The calibrating or selective resistance 81 varies the range of operation or variation of the arm of the resistance bridge which includes the rheostat resistance 82 in order to permit the control circuit to be adjusted for satisfactory operation under different soil conditions and under different lawn conditions. For example, sandy soils can hold only approximately ten per cent of their weight in moisture when saturated while clay soils hold as much as thirty-five per cent of their weight in moisture when saturated. Thus the clay soils serve as a good reservoir of water and require less frequent sprinklings than sandy soils since loss of water from the ground due to direct evaporation and also to transpiration by plants will reduce the percentage of available moisture in sandy soils during hot, dry weather at a far more rapid rate than the rate of such loss from clay soils which hold more water to being with.

The indicia 106a on the front panel 104 indicate the percentage of possible moisture content of the soil at which the sprinkler control system will be operated as shown in the following table when the pointer 105 is set at the particular index:

| Index: | Moisture percent |
| --- | --- |
| 1 | 25 |
| 2 | 28 |
| 3 | 31 |
| 4 | 34 |
| 5 | 38 |
| 6 | 46 |
| 7 | 52 |
| 8 | 63 |
| 9 | 75 |
| 10 | 100 |

The index 10 represents saturation 100% possible moisture content for either sandy soil capable of holding only 10% of its weight in moisture or a clay capable of holding 35% of its weight in moisture. Since the control circuit ordinarily performs its cycle of operation once every twenty-four hours and since the wilt point of vegetation is generally considered to be at 25% of available ground moisture in both sandy and clay soils (represented by the index #1 on front panel) a reserve of 50% of moisture may be sufficient for a sandy soil and the pointer 105 would be set at the index 9 on the front panel which indicates an available moisture content of 75%.

By comparison, a reserve of only 21% may be necessary for a clay soil since it can hold so much more moisture by weight and so the control circuit would be set to operate when the moisture content of the clay soil dropped to 46% as represented by the index 6.

Thus, for the sand soils which have poor water retention characteristics, the pointer 105 is pre-set at the index 9 or 10 to cause more frequent sprinklings to occur to prevent the moisture content of the sandy soil from dropping below 75% to 100% at the time of initiating of operation of the control circuit. Moreover, lawn conditions vary. For example, new lawns require surface saturations to accelerate germination of the seed and the growth of the seedlings even though the moisture content of the soil would be sufficient for old established lawns and would require no additional sprinklings. Thus, in the case of new lawns, the pointer 105 would be set at the index 10 regardless of the type of soil so that a continuous saturation would be had by daily waterings.

The selective resistance 81 is operated by a rotatable shaft which projects through the front panel 104 of the case 94 and is provided with the pointer knob 105 by means of which it may be rotated. Indicia 106 on the front panel are provided to indicate the value of the selective resistance and thus the value of the resistance of the moisture sensing elements which must exist to cause the relay 22 to be operated. It will be evident that if the value of resistance 81 is high, the relay 22 will be energized when the value of the resistance of the moisture elements is greater than a relatively high value and that when the value of the resistance 81 is low, the relay 22 will be energized only if the value of the resistance of the moisture elements falls below a relatively low value. When the value of the resistance 81 is low, the sprinkling system will be operated only when the moisture content of the soil is relatively very small and when it is high the sprinkling system will be operated even though the moisture content of the soil is relatively high. Variations in the water retention characteristics of different soils may also be accommodated by adjustment of the selective resistance. Thus, the resistance 81 would be adjusted to a relatively high value if the particular soil had relatively good water retention characteristics and at a relatively low value if the particular soil had poor water retention characteristics.

The calibrating resistance 83 provides a means for adjusting the total resistance of the arm of the resistance bridge which includes the moisture sensing elements to compensate for the capacitance effects between the conductors leading to the moisture sensing elements, the capacitance effects varying with variations in the lengths of such conductors. The calibrating resistance can be varied to increase or decrease the resistance in this arm of the resistance bridge and insure that the current in the relay meter coil 63 approaches zero just as the roller 56 of switch 54 approaches the surface 57 of cam 38 when the pointer 105 is set on the index 10 and the soil element is saturated.

The dial 107 of the clock 23 may also be disposed outwardly of the front panel and may be provided with a plurality of threaded apertures 108 which are adapted to receive trip pins 109. The trip pins serve the same function as the trip arm 29 of the clock shown in my copending application, Serial No. 269,079, to engage the cam 35 of that clock and thus actuate the mechanism which closes the clock switch. If it is desired to test the moisture content of the soil more than once a day, two or more pins are screwed into selected apertures 108 so that the cycle of operation of the control circuit takes place two or more times each day. The provision of several pins permits the watering of new lawns several times each day. Extra pins 109 when not in use are screwed in threaded apertures of a bracket 110 of the front panel.

It will be seen now that a new and improved control circuit has been illustrated and described which can be adjusted to operate under different conditions to actuate the load device 22 when certain conditions prevail as indicated by an electrical characteristic, such as the resistance of the moisture sensing elements, at a preset time or times of the day.

While the control circuit has been described as used with a lawn sprinkling system, it will be obvious that it has utility in other applications as well. For example, it may be used to control irrigation by controlling the gates of the irrigation canals or to control the humidity in green houses. It may also be used in any other applications where a load device must be actuated when the value of an electrical quantity falls within a certain range of values.

Manifestly, the construction as shown and described is capable of some modification and such modification as may be construed to fall within the scope and meaning of the appended claims is also considered to be within the spirit and intent of the invention.

What is claimed is:

1. An electrical control circuit for sensing a variable electrical resistance and operating an electrical device when the value of the electrical resistance falls within a predetermined range of values comprising: means providing a comparison electrical resistance; means connected to said first mentioned means for varying said comparison electrical resistance over a predetermined range; means for producing an electrical current which varies as the difference between said electrical resistances; relay means for connecting said electrical device to a supply circuit when the value of said current approaches zero; and means operable simultaneously with said means for varying said comparison electrical resistance for preventing connection of said electrical device to said supply circuit when the value of said current approaches zero while the value of the comparison electrical resistance does not exceed a predetermined value.

2. An electrical control circuit for sensing a variable electrical resistance and operating an electrical device when the value of the electrical resistance falls within a predetermined range of values comprising: means providing a comparison electrical resistance; means connected to said first mentioned means for varying said comparison electrical resistance over a predetermined range; means for producing an electrical current which varies as the difference between said electrical resistances; relay means for connecting said electrical device to a supply circuit when the value of said current approaches zero; means operable simultaneously with said means for varying said comparison electrical resistance for preventing connection of said electrical device to said supply circuit when the value of said current approaches zero while the value of the comparison electrical resistance does not exceed a predetermined value; and means for initiating at predetermined times a cycle of operation of said means for varying said comparison electrical resistance, said means for producing an electrical current and said means for preventing operation of said electrical device.

3. An electrical control circuit for sensing a variable resistance and connecting an electrical device to a source of current when the variable resistance does not exceed a predetermined value comprising: a resistance bridge having two arms, one of said arms including said variable resistance, whereby the resistance of said one of said arms varies as said variable resistance; a second resistance connected in the other of said arms and variable over a predetermined range, said bridge being adapted to be connected to a source of current; relay means connected between said arms of said bridge, said relay means being energized with current which varies in accordance with the difference between the resistances of said arms, said relay means connecting said electrical device to said source of current when said current in said relay means approaches zero; a switch means connected in series with said electrical device and said relay means; means for simultaneously varying said second resistance and operating said switch means to prevent connection of said electrical device to said supply circuit when the value of said current approaches zero while the value of said second resistance does not exceed a predetermined value.

4. An electrical control circuit for sensing a variable resistance and connecting an electrical device to a source of current when the variable resistance does not exceed a predetermined value comprising: a resistance bridge having two arms, one of said arms including said variable resistance, whereby the resistance of said one of said arms varies as said variable resistance; a second resistance connected in the other of said arms and variable over a predetermined range, said bridge being adapted to be connected to a source of current; relay means connected between said arms of said bridge, said relay means being energized with current which varies in accordance with the difference between the resistances of said arms, said relay means connecting said electrical device to said source of current when said current in said relay means approaches zero; a switch means connected in series with said electrical device and said relay means; means for simultaneously varying said second resistance and operating said switch means to prevent connection of said electrical device to said supply circuit when the value of said current approaches zero while the value of said second resistance does not exceed a predetermined value; and means for initiating at predetermined times a cycle of operation of said last mentioned means.

5. An electrical control circuit for sensing a variable resistance and connecting an electrical device to a source of current when the variable resistance does not exceed a predetermined value comprising: a resistance bridge having two arms, one of said arms including said variable resistance, whereby the resistance of said one of said arms varies as said variable resistance; a second resistance connected in the other of said arms and variable over a predetermined range, said bridge being adapted to be connected to a source of current; relay means connected between said arms of said bridge, said relay means being energized with current which varies in accordance with the difference between the resistances of said arms, said relay means connecting said electrical device to said source of current when said current in said relay means approaches zero; a switch means connected in series with said electrical device and said relay means; means for simultaneously varying said second resistance and operating said switch means to prevent connection of said electrical device to said supply circuit when the value of said current approaches zero while the value of said second resistance does not exceed a predetermined value, said other arm including a variable selective resistance for varying said predetermined value of said variable resistance.

6. An electrical control circuit for sensing a variable resistance and connecting an electrical device to a source of current when the variable resistance does not exceed a predetermined value comprising: a resistance bridge having two arms, one of said arms including said variable resistance, whereby the resistance of said one of said arms varies as said variable resistance; a second resistance connected in the other of said arms and variable over a predetermined range, said bridge being adapted to be connected to said source of current; relay means connected between said arms of said bridge, said relay means being energized with current which varies in accordance with the difference between the resistances of said arms, said relay means connecting said electrical device to said source of current when said current in said relay means approaches zero; a switch means connected in series with said electrical device and said relay means; means for simultaneously varying said second resistance and operating said switch means to prevent connection of said electrical device to said supply circuit when the value of said current approaches zero while the value of said second resistance does not exceed a predetermined value; and means for initiating at predetermined times a cycle of operation of said last mentioned means, said other arm including a variable selective resistance for varying said predetermined value of said variable resistance.

7. An electrical control circuit for sensing a variable resistance and connecting an electrical device to a source of current when the variable resistance does not exceed a predetermined value comprising: a resistance bridge having two arms; means energizing said bridge with current; said bridge having two arms, one of said arms including said variable resistance whereby the resistance of said one of said arms varies as said variable resistance; a second resistance connected in the other of said arms and variable over a predetermined range of values; relay means connected between said arms of said bridge and energized by a current which varies in accordance with the difference between the total resistances of said two arms; said relay means including a contact; a switch, said contact and said switch connecting said electrical device to said source of current when both are moved to closed positions, said relay means moving said contact to closed position when said current approaches zero; a cam for moving said switch to closed position; and driving means for simultaneously moving said cam and varying said second resistance through said predetermined range, said cam keeping said switch closed only while said second resistance exceeds a predetermined value in said predetermined range.

8. An electrical control circuit for sensing a variable resistance and connecting an electrical device to a source of current when the variable resistance does not exceed a predetermined value comprising: a resistance bridge having two arms; means energizing said bridge with current; said bridge having two arms, one of said arms including said variable resistance whereby the resistance of said one of said arms varies as said variable resistance; a second resistance connected in the other of said arms and variable over a predetermined range of values; relay means connected between said arms of said bridge and energized by a current which varies in accordance with the difference between the total resistances of said two arms; said relay means including a contact; a switch, said contact and said switch connecting said electrical device to said source of current when both are moved to closed positions, said relay means moving said contact to closed position when said current approaches zero; a cam for moving said switch to closed position; and driving means for simultaneously moving said cam and varying said second resistance through said predetermined range, said cam keeping said switch closed only while said second resistance exceeds a predetermined value in said predetermined range; means for connecting said driving means to a source of current at predetermined times to initiate a cycle of operation of said driving means; and means for disconnecting said driving means from said source of current upon completion of a cycle of operation.

9. An electrical control circuit for sensing a variable resistance and connecting an electrical device to a source of current when the variable resistance does not exceed a predetermined value comprising: a resistance bridge having two arms; means energizing said bridge with current; said bridge having two arms, one of said arms including said variable resistance whereby the resistance of said one of said arms varies as said variable resistance; a second resistance connected in the other of said arms and variable over a predetermined range of values; relay means connected between said arms of said bridge and energized by a current which varies in accordance with the difference between the total resistances of said two arms; said relay means including a contact; a switch, said contact and said switch connecting said electrical device to said source of current when both are moved to closed positions, said relay means moving said contact to closed position when said current approaches zero; a cam for moving said switch to closed position; and driving means for simultaneously moving said cam and varying said second resistance through said predetermined range, said cam keeping said switch closed only while said second resistance exceeds a predetermined value in said predetermined range, said other arm including a variable selective resistance for varying said predetermined value of said variable resistance.

10. An electrical control circuit for sensing a variable resistance and connecting an electrical device to a source of current when the variable resistance does not exceed a predetermined value comprising: a resistance bridge having two arms; means energizing said bridge with current; said bridge having two arms, one of said arms including said variable resistance whereby the resistance of said one of said arms varies as said variable resistance; a second resistance connected in the other of said arms and variable over a predetermined range of values; relay means connected between said arms of said bridge and energized by a current which varies in accordance with the difference between the total resistances of said two arms; said relay means including a contact; a switch, said contact and said switch connecting said electrical device to said source of current when both are moved to closed positions, said relay means moving said contact to closed position when said current approaches zero; a cam for moving said switch to closed position; and driving means for simultaneously moving said cam and varying said second resistance through said predetermined range, said cam keeping said switch closed only while said second resistance exceeds a predetermined value in said predetermined range; means for connecting said driving means to a source of current at predetermined times to initiate a cycle of operation of said driving means; and means for disconnecting said driving means from said source of current upon completion of a cycle of operation, said other arm including a variable selective resistance for varying said predetermined value of said variable resistance.

11. A control circuit for operating an electrical load device comprising: a first moisture sensing means adapted to be disposed in a first environment whose resistance varies in accordance with the moisture content of said first environment; a second moisture sensing means adapted to be disposed in a second environment whose resistance varies in accordance with the moisture content of said second environment; means providing a comparison resistance; means for varying said comparison resistance over a predetermined range of values; means for producing an electrical current which varies in accordance with the difference in value between the value of said comparison resistance and the combined value of the resistance of said moisture sensing means; and means responsive to said current for energizing said load device when said current reaches a predetermined value, said current reaching said predetermined value when the moisture contents of both said environments fall below individual predetermined values.

12. A control circuit for operating an electrical load device comprising: a first moisture sensing means adapted to be disposed in a first enviroment whose resistance varies in accordance with the moisture content of said first environment; a second moisture sensing means adapted to be disposed in a second environment whose resistance varies in accordance with the moisture content of said second environment; means providing a comparison resistance; means for varying said comparison resistance over a predetermined range of values; means for producing an electrical current which varies in accordance with the difference in value between the value of said comparison resistance and the combined value of the resistance of said moisture sensing means; means responsive to said current for energizing said load device when said current reaches a predetermined value, said current reaching said predetermined value when the moisture contents of both said environments fall below individual predetermined values; and means for connecting said various means to a source of current at a predetermined time for a predetermined time interval during which the value of said comparison resistance is varied over said predeterimned range of value.

13. The control circuit of claim 8, and means for connecting said driving means and said resistance bridge across said source of current at a predetermined time for a predetermined time interval during which said second resistance is varied through said predetermined range.

14. The control circuit of claim 1, and means for connecting said various means to said source of current at a predetermined time for a predetermined time interval during which the value of said comparison electrical quantity is varied over said predetermined range of values.

References Cited in the file of this patent

UNITED STATES PATENTS

| | | |
|---|---|---|
| 2,031,146 | Dodge | Feb. 18, 1936 |
| 2,045,381 | Elberty | June 23, 1936 |
| 2,577,337 | Lancaster | Dec. 4, 1951 |
| 2,578,981 | Parker | Dec. 18, 1951 |
| 2,599,862 | Ray | June 10, 1952 |
| 2,695,976 | Hasenkamp | Nov. 30, 1954 |